Dec. 10, 1946.  W. E. EDELMAN  2,412,254
MOTOR
Filed March 27, 1942
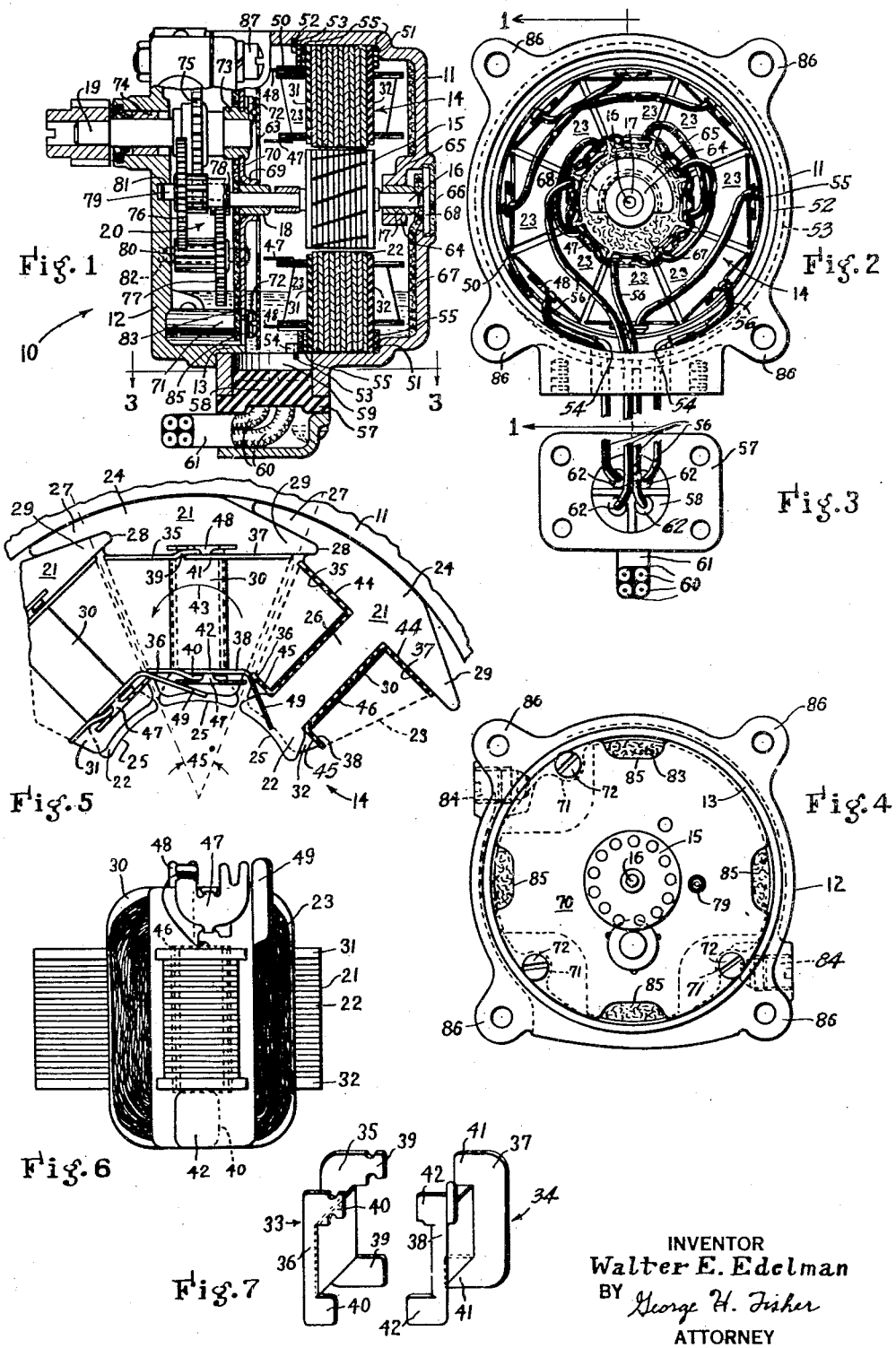
INVENTOR
Walter E. Edelman
BY George H. Fisher
ATTORNEY Patented Dec. 10, 1946

2,412,254

UNITED STATES PATENT OFFICE 2,412,254

MOTOR

Walter E. Edelman, Minneapolis, Minn., assignor to Minneapolis-Honeywell Regulator Company, Minneapolis, Minn., a corporation of Delaware Application March 27, 1942, Serial No. 436,455

12 Claims. (Cl. 171—252)

This invention relates to the motor art but more particularly to improvements in the construction and arrangements of parts in electrical motors providing greater efficiency in operation, promoting increased economy of construction, facilitating assembly and increasing the accessibility of parts for purposes of replacement and repair. The present invention is concerned primarily with improvements in relatively small motors, but it will be understood that the features are not limited thereto and may be applied to motors of other sizes as well.

A broad object of this invention is the provision of a comparatively small motor which is unusually powerful in proportion to its size.

Another object of this invention is to provide a comparatively powerful motor in proportion to its size by utilizing the necessary iron and copper in advantageous proportions.

A further object of this invention is to provide a motor having an advantageous copper to iron ratio by utilizing all available space for winding purposes.

Another object of this invention is to provide a stator comprising a plurality of laminated sections each having wound thereon a substantially cone-shaped winding, the sides of which are substantially coincident with its adjacent windings.

Another object of this invention is to provide novel means for retaining the stator sections in assembled relation.

A further object of this invention is to provide a novel bobbin which is fabricated upon the stacked laminae comprising a stator section in such a manner as to permit a winding to be wound thereon.

Other objects relate to novel means for lubricating the motor shaft and gear train driven thereby, novel bearing construction, novel construction assuring proper bearing alignment, and novel motor housing construction.

Still other objects are those not specifically recited hereinabove which will become apparent or implied from a reading of the specification, reference being had to the accompanying drawing in which Figure 1 is a section of the device through the rotor shaft as viewed along the line 1—1 of Figure 2, Figure 2 is a face view of the device with the cover and rotor removed, Figure 3 is a face view of the terminal block as viewed along the line 3—3 of Figure 1, Figure 4 is an inside face view of the cover and associated parts as removed from the rest of the device, Figure 5 is an enlarged fragmentary view of a portion of the stator and casing, Figure 6 is an enlarged face view of a stator section, and Figure 7 is a perspective view of parts of the fabricated bobbin.

Referring to Figure 1, the numeral 10 generally indicates a motor operator which is illustrated approximately to actual size. The motor operator 10 is housed by a pair of telescoping casing members 11 and 12, the casing member 12 comprising a cover and having an annular flange 13 which is telescopingly received into the casing member 11. The numeral 14 generally designates a stator, to be described in detail hereinafter, which is located in the main casing member 11. A rotor 15 cooperates with the stator 14 and is operatively secured to a shaft 16 which is rotatably supported in a pair of bearings 17 and 18 carried by and concentrically disposed with respect to the casing members 11 and 12 respectively. The bearings 17 and 18 will be described in greater detail hereinafter. The rotor shaft 16 drives an operator shaft 19 through a gear train, generally indicated by the numeral 20. It will be noted that though the rotor 15 is supported by separate interfitting members 11 and 12, the proper alignment of shaft 16 is assured by virtue of the telescoping arrangement of the casing members 11 and 12. Since the novel features of the motor operator 10 pertain primarily to the novel structure of the stator 14, and the novel manner in which it is mounted in the casing 11, it is thought expedient to first describe the stator construction and mounting in detail after which the other novel features of the motor operator which are incidents thereof will be similarly disposed of.

Referring to Figure 5, it will be seen that the stator 14 comprises a plurality of identical interlockable sections 21. Each section 21 comprises a plurality of laminations 22 (see Figures 1 and 6) which are held in stacked relation by a field winding 23 which is wound directly on each section 21. Each section 21 has an arcuate yoke portion 24 which conforms with the inner cylindrical surface of the casing member 11, a pole-face portion 25 which is concentrically formed with respect to the casing 11, and a pole portion 26 radially disposed with respect to the casing 11. Each pole portion 26 carries a field winding 23. Each yoke portion is extended to each side of the pole portion, the extension on one side having a tongue 27 and a groove 28 and the extension on the other side having a tongue 29 which engages the tongue and groove of the adjacent section. The arrangement of the tongue 27, groove 28, and tongue 29 of each section is such that when the sections 21 are assembled and a circumferential pressure is applied as by an annular ring, band, or, as in the illustrative case, the casing 11, the reactions between the tongue 27, groove 28, and tongue 29 rigidly hold the pole face portions 25 in circumferentially spaced relation. In practice, the sections are assembled, a circumferential pressure is applied by means not shown, and the stator 14 is then pressed as a unit into the casing 11. It should be pointed out that the interfitting relation of the sections provides a low reluctance magnetic path in the yoke of the stator, and the cross section of the yoke may be a minimum consistent with good engineering practice since the need for holes for receiving rivets, bolts or the like, is obviated. Accordingly, the resultant reduction in the amount of iron necessary in the stator makes available a greater space for winding purposes. Consequently, by obtaining a greater proportion of copper to iron, a more compact and smaller motor may be obtained which is comparatively more powerful in proportion to its size.

It will be seen in Figure 5 that each pole face portion 25 is of a maximum width nearly touching its adjacent pole face portions. The width of each pole face portion 25, therefore, is determined by a central angle which is a function of the number of poles. Since all of the sections 21 are identical it naturally follows that the width of each yoke portion 24 is likewise determined by the same central angle. In the illustrative case, the stator 14 has 8 physical poles and accordingly the dimensions of each section 21 are determined by a central angle of 45° as shown in Figure 5. It will be further noted that the cross section of the pole portion 26 is considerably less than the cross section of its pole face portion 25. While this arrangement precludes the use of a preformed field winding 23, it has the advantage of making available a greater space for the winding without objectionably increasing the reluctance of the magnetic path in the pole portion.

Each winding 23 is formed substantially cone-shaped, being wound to such dimensions as to be substantially included in the central angle hereinabove referred to. Accordingly, each side of each winding 23 is substantially coincident with the side of the adjacent winding thereby utilizing practically all of the available space occupied by the stator except such space as is necessary to prevent a short circuiting between windings. As a matter of fact, when the stator is viewed from one side, as in Figure 2, there is substantially no air space between the windings.

To properly insulate each winding 23 from its section 21 as well as to properly confine the same to its cone-shape thereon, a bobbin 30 is fabricated about the pole portion 26 of each section 21. Each bobbin 30 comprises a first pair of insulation pieces 31, 32 which may be formed of any suitable material such as Bakelite. Pieces 31, 32 are shaped similarly to the section laminations 22 and are disposed at the top and bottom respectively of each section 21. Each bobbin 30 further comprises a second pair of insulation pieces 33, 34 which may be formed of any suitable material such as gray fibre. Pieces 33, 34 are disposed adjacent the sides of each pole portion 26 in overlapping relation with respect to the first pair of insulation pieces 31, 32 as indicated by the dotted lines in Figure 6. The bobbin pieces 33, 34 are substantially H-shaped, each having outer and inner doubled-back portions 35, 36 and 37, 38 respectively, which cooperatively comprise the outer and inner flange portions of the bobbin. The doubled-back portions 35, 36 of the bobbin piece 33 comprise upper and lower extensions 39 and 40 which extend transversely above and below the pole portion 26. Likewise the doubled-back portions 37, 38 have extensions 41 and 42 which extend transversely above and below the pole portion 26 in overlapping relation with respect to the extensions 39 and 40. The flange portions 35, 36 and 37, 38 may be regarded as the vertical bars of the H-shaped bobbin pieces 33, 34, and the portions thereof adjacent the sides of the section 21 may be considered the crossbars of the H-pieces. As will be pointed out hereinafter, the extensions 39, 40 and 41, 42 are overlapped in such a manner as to prevent a catching of the winding 23 on the extensions in the process of winding it in the bobbin 30.

In practice, each section 21 is fabricated by first stacking the laminations 22. The insulation pieces 31 and 32 are then placed on the top and bottom of the stack respectively. The bobbin pieces 33, 34 are then placed adjacent the sides of the pole portion 26 between the lateral extensions of the yoke and pole face portions. The upper extensions 41, 42 of the bobbin piece 34 are placed inwardly of the upper extensions 39, 40 of the bobbin piece 33. Likewise the lower extensions 39, 40 of the bobbin 33 are placed inwardly of the lower extensions 41, 42 of the bobbin piece 34. Thus, by the overlapping arrangement of the extensions, as clearly seen in Figure 5, it is possible to wind the winding 23 in the direction of arrow 43 without the winding being caught on the extensions. It will be noted that the faces 44 of the yoke portion extensions are formed normally with respect to their pole portion 26 to support the doubled-back portions 35, 37 of the bobbin pieces 33, 34 normally of the pole portion 26. Likewise the insulation pieces 31, 32 have normally extended surfaces 45 for supporting the doubled-back portions 36, 38 of the bobbin pieces 33, 34 normally of the pole portion 26. Thus, each section 21 may be rotated about the axis of its pole portion 26 and the winding 23 wound in the bobbin 30 by a simple winding process without the need of a complicated guide means. To hold each bobbin 30 in assembled condition before the winding process is begun, a single layer of tape 46 is wound about the pole portion 26. The section is then mounted in a suitable winding jig, not shown, and the winding wound directly in the bobbin forming the cone-shape referred to hereinabove. The ends of the windings are then secured to inner and outer terminal pieces 47, 48 secured to the upper extensions 39, 40 of bobbin piece 33, as best seen in Figures 5 and 6. The winding 23 is then coated with a suitable sealing compound such as glass cement or varnish to hold the winding turns of greater radii from slipping down over the turns of lesser radii. The sections 21 are then assembled as previously described, and inserted as a unit into the casing member 11. To prevent the inner terminals 47 from moving inwardly and short circuiting each other, a flag 49 is provided on the doubled-back portion 38 of each bobbin piece 34. Each flag 49 extends adjacent to a terminal 47 on the adjacent section 21 as best shown in Figure 5. To prevent the outer terminals 47 from moving outwardly and engaging the casing 11, a ring 50 is placed around them. The ring 50 may be formed of a strip of gray fiber the ends of which are interlocked as seen in Figure 2.

The stator 14 is held in position in the casing 11 by a pair of retaining means in the form of a shoulder 51 formed in the casing 11 and a split ring 52 which is received in an annular groove 53, also formed in the casing 11. The ring 52 has turned up ends 54 by means of which the ring may be removed from the groove and the stator 14 removed from the casing for such purposes as repairing or replacing the stator section 21. One or more rings 55 of resilient material such as cork or any other suitable compressible material are inserted between the stator 14 and the retaining means 51, 52. The rings 55 fulfill a dual purpose, serving to take up the variations in the thickness of the stators 14 resulting from the variations in the thickness of the laminations 22, and also serving to absorb somewhat the magnetic vibrations set up in the stator 14.

As shown in Figure 2, the windings 23 are connected to provide a split phase induction motor arrangement in which the four lead wires 56 are brought out to a terminal block 57. The terminal block 57 has a hub portion 58 which is received in a circular aperture 59 formed in the casing member 11. The lead wires 56 are electrically connected to the wires 60 of a cable 61. As a matter of fact, in actual practice, the wires 60 are bared for a length corresponding to the lead wires 56 and extended through apertures 62 provided in the terminal block. The apertures 62 are then filled with solder, thereby providing an oil tight connection with respect to the casing 11. The bared lead wires 56 are covered with a suitable insulating material such as synthetic rubber, which is not subject to deterioration by the action of the oil which is maintained in the motor operator housing for purposes of lubrication as will hereinafter appear. A washer 63 (see Figure 1) of suitable insulation material such as gray fiber is placed between the casing member 12 and the terminals 47 and 48 to insulate them from the casing 12.

Having fully described the stator 14 including the details of its construction, fabrication, and mounting with respect to the casing member 11, the rotor 15 will now be described in detail including the manner in which it is rotatively supported so as to cooperate efficiently with the stator 14, the manner in which it shares a common support with the gear train 20 so as to provide a proper driving connection therewith, and the manner in which the gear train and rotative support for the rotor 15 are lubricated.

In the foregoing description of the stator 14 it has been seen how the pole faced portions 25 have been rigidly spaced circumferentially and concentrically with respect to the casing member 11 without the use of rivets, bolts, or the like holding means, and without the need of machining the pole faces to assure their concentricity. Since the rotor 15 is of the squirrel cage induction type, the importance of the proper alignment of the stator 14 and rotor 15 will be appreciated inasmuch as a smaller air gap is made possible resulting in greater efficiency.

It will now be seen how the bearings 17, 18 for the rotor shaft 16 are supported so as to assure the concentricity of the rotor 15 with respect to the casing member 11 thereby providing efficient cooperation between the rotor 15 and the stator 14.

The bearing 17 is supported in a hub 64 which is extended inwardly of the casing 11 to reduce the overall length of the motor operator 10 as well as to utilize the space between the rotor 15 and the casing end wall resulting from the extension of the coil 23 to each side of the stator 14. The hub 64 is spaced somewhat from the closed end of the casing 11 and is integrally connected therewith by an arcuate web 65. In practice, the casing 11 is first received in the form of a rough casting in which the hub 64 projects directly from the closed end of the casing, the hub 64 and web 65 appearing as indicated by the full lines in Figure 2. The bearing support 64 is formed by first boring the aperture in which the bearing 17 is received concentrically with respect to the casing 11. The aperture is then counter-bored until the arcuate web 65 is formed and an opening is provided between the hub 64 and the closed end of the casing 11. The casing 11 is then further counter-bored and a plug 66 is inserted therein to again close the casing. Bearing 17 is lubricated by an oil conductive means which may be in the form of a felt pad 67 which is disposed adjacent to the closed end of the casing 11 and has a portion 68 which extends between the bearing 17 and the plug 66. The pad 67 extends into the oil which is maintained approximately at a level as shown in Figure 1. The bearing 17, accordingly, is lubricated by a capillary action of the oil in the pad 67.

The bearing 18 is supported by a flange 69 provided in a plate 70 which is telescopingly received in the casing member 12. The plate 70 is supported on posts 71 integrally formed with the casing member 12 and secured to the posts by suitable screws 72. The gear train 20 is rotatively supported between the plate 70 and the casing member 12, the operator shaft 19 being rotatively supported in a bearing 73 staked to the plate 70 and a bearing 74 conveniently supported in the casing member 12. A gear 75 operatively secured to the shaft 19 is driven by a dual gear 76 which in turn is driven by a second dual gear 77. The gear 77 is driven by a pinion 78 which is operatively secured to the motor shaft 16. It is obvious that because of the arrangement of the pinion 78 and rotor 15 on opposite sides of the plate 70 the rotor and casing member 12 are removable as a unit from the casing member 11. Consequently, the driving connection between the rotor 15 and the gear train 20 is not disturbed by such a removal. Furthermore, the removal of the rotor 15 renders the stator more accessible for purposes of inspection and repair. The dual gears 76, 77 are mounted for rotation on pins 79, 80 respectively which are staked to the plate 70 and received into sockets 81 and 82 which are formed in the casing member 12. From the foregoing, it is obvious that the concentricity of bearing 18 with respect to the casing member 11 is assured by the telescoping relation of the plate 70 with respect to the casing member 12 which in turn is telescopingly fitted with respect to the casing member 11. Moreover, the proper meshing relation of the gears of the gear train 20 is assured by virtue of the telescoping arrangement of the plate 70 with respect to the casing member 12 and the provision of the sockets 81, 82 for receiving the pins 79, 80 respectively.

The lubrication of shafts 16 and 19 in bearings 18 and 73, respectively, and lubrication of dual gears 76 and 77 on pins 79 and 80 respectively, is provided by an oil conductive means which may be in the form of a felt pad 83 which is disposed adjacent to the plate 70. The pad 83 is arranged to surround the pins 79, 80, the shaft 16, and the bearing 73 are lubricated by the capillary action of the oil in the pad 83. As in the case of pad 67, the pad 83 also extends below the level of the oil as best seen in Figure 1. It will be noted that the gear train 20 also extends somewhat below the level of the oil. Consequently the oil is further distributed to the gear train parts by means of a "splashing action" which results from the rotation of the gears.

Oil is admitted into the motor operator housing through suitable removable plugs 84 which are conveniently provided in the casing member 12 as best seen in Figure 4. The plate 70 is provided with four indentations 85 which permit the oil to reach the felt pad 67. Accordingly, the motor operator 10 may be placed in any one of four positions without interfering with the proper lubrication of the operating parts.

Each casing member is provided with four cooperating apertured ears 86 by means of which the casing members may be assembled in any one of four positions with respect to each other, thereby providing four different positions of the operating shaft 16 with respect to a particular mounting of the casing member 11. Suitable bolts and screws 87 may be used to secure the casing members together.

From the foregoing it is now apparent that I have provided a compact motor which necessarily is comparatively powerful in proportion to its size since all available space has been utilized for winding purposes, thereby providing an advantageous ratio of copper to iron. Moreover, the motor may be economically produced and efficiently operated in practice because of the novel construction, fabrication, and arrangement of parts.

It is to be understood that the disclosure of the present invention is illustrative only and not to be considered in a limiting sense, since I contemplate all such changes, variations, adaptations, additions, and omissions, which naturally fall within the inventive concept of this invention as defined by the appended claims.

I claim as my invention:

1. In a multipolar stator, a stator section comprising a radial pole portion of uniform cross-section, a yoke portion extended normally to each side of said pole portion, and a pole face portion extended to each side of said pole portion, said extension of said yoke and pole face portions being determined by a central angle which is a function of the number of poles.

2. In a multipolar stator, a stator section comprising a radial pole portion, yoke and pole face portions extended to each side of said pole portion, and a bobbin comprising a central portion for enclosing said pole portion and inner and outer side portions disposed adjacent said pole face portions and yoke portions respectively, said bobbin side portions and said yoke and pole face portions being limited by a central angle which is a function of the number of poles.

3. In a multi-polar stator, a radial pole portion, a bobbin supported thereon, a winding on said bobbin, said bobbin having a central portion for enclosing said pole portion and inner and outer side portions for confining said winding, terminal pieces carried by said side portions for connections with said windings, and a lateral extension on one of said inner side portions for overlapping and insulating the terminal piece carried by the adjacent bobbin side portion.

4. In a motor, a pair of telescoping casing members, a stator in a first of said members, a rotor for cooperation with said stator, a shaft for said rotor, a plate telescopingly received in the second of said members and secured thereto, said shaft being journalled in said plate and said first casing member, and a gear train journalled between said second member and said plate in drivable relation with respect to said shaft, said rotor being removable from said first member together with said second member whereby said rotor and gear train are removable as a unit.

5. A motor operator comprising a pair of telescoping casing members, a bearing concentrically supported by each member in axially spaced relation with respect to the end portion thereof, oil conductive means for lubricating said bearings and disposed between each said bearing and the end portion of its respective supporting member, a rotor journalled in said bearings, a gear train driven by said rotor and journalled in one of said casing members, said gear train being lubricated by the oil conductive means in said one of said casing members, and a stator for cooperation with said rotor, said stator comprising a plurality of interlockable sections insertable as a unit in the other of said casing members in concentric alignment with respect to the rotor, and retaining means for providing axial alignment of said stator with respect to said rotor.

6. A multi-polar motor stator comprising a plurality of circumferentially related stator sections, each section comprising a radial pole portion, a bobbin supported thereon, a winding on said bobbin, said bobbin having a central portion for enclosing said pole portion and inner and outer side portions for confining said winding, said winding being cone-shaped, dimensions of said winding and said inner and outer side portions of said bobbin being determined by a central angle which is a function of the number of the poles, and terminal pieces carried by said inner and outer bobbin side portions for electrical connection with said winding, a further portion of one of said inner side portions of each of said bobbins bearing a member projecting laterally, whereby to inwardly overlie said terminal piece carried by said inner side of an adjacent bobbin, and insulated means surrounding said stator and outwardly overlying said terminal pieces carried by said outer sides of said bobbins.

7. A multi-polar motor stator comprising a plurality of circumferentially related stator sections, each section comprising a radial pole portion, a bobbin supported thereon, a winding on said bobbin, said bobbin having a central portion for enclosing said pole portion and inner and outer side portions for confining said winding, said winding being cone-shaped, dimensions of said winding and said inner and outer side portions of said bobbin being determined by a central angle which is a function of the number of the poles, and terminal pieces carried by said inner and outer bobbin side portions for electrical connection with said winding, a further portion of one of said inner side portions of each of said bobbins bearing a member projecting laterally, whereby to inwardly overlie said terminal piece carried by said inner side of an adjacent bobbin.

8. A multi-polar motor stator comprising a plurality of circumferentially related stator sections, each section comprising a radial pole portion, a bobbin supported thereon, a winding on said bobbin, said bobbin having a central portion for enclosing said pole portion and inner and outer side portions for confining said winding, said winding being cone-shaped, dimensions of said winding and said inner and outer side portions of said bobbin being determined by a central angle which is a function of the number of the poles, terminal pieces carried by said inner and outer bobbin side portions for electrical connection with said winding, and insulated means surrounding said stator and outwardly overlying said terminal pieces carried by said outer sides of said bobbins.

9. In a motor, a stator, a rotor for cooperating therewith, a shaft for said rotor, side walls and end walls comprising a pair of casing members housing said stator and said rotor, bearing supports carried by said members and disposed in axially spaced relationship therewith for rotatably supporting said shaft, means intermediary between said members and said supports, at least one of said means being integral with and overlying a portion of the related member, and oil conducting means between said support and said member and extending to said side walls of said members, said shaft extending through said support for lubricating contact with said oil conducting means.

10. In a motor casing, a rotor supported at its ends for rotation in said casing, a shaft for said rotor, and means for lubricating an end of said rotor shaft comprising the shaft, means forming a bearing for said shaft, said end of said shaft extending through said means, second means supporting said first means and axially spaced therefrom, said second means including a portion of said casing, and oil conducting means supported by said second means, a portion of said oil conducting means extending between said first means and said second means in lubricating contact with said end of said shaft.

11. A multi-polar motor stator comprising a plurality of identical, circumferentially adjacent sections each having a radial pole portion, an enlarged pole face portion extending to each side of said pole portion and a yoke portion extending to each side of said pole portion, each yoke portion being formed to interlock with adjacent yoke portions and including an inwardly facing plane surface extending to each side of said pole portion and perpendicular to the axis thereof, no part of said yoke portion extending beyond said surface in the direction of said enlarged pole face, the axes of said pole portions being directed toward a common point, and said extensions of said yoke and pole face portions of each of said sections being determined by an angle defining with said plane surface the outline of a space to receive a tapering winding surrounding said pole portion.

12. A multi-polar motor stator comprising a plurality of identical, circumferentially adjacent sections each having a radial pole portion, an enlarged pole face portion extending to each side of said pole portion and a yoke portion extending to each side of said pole portion, each yoke portion being formed to interlock with adjacent yoke portions and including an inwardly facing plane surface extending to each side of said pole portion and perpendicular to the axis thereof, no part of said yoke portion extending beyond said surface in the direction of said enlarged pole face, the axes of said pole portions being directed toward a common point, said extensions of said yoke and pole face portions of each of said sections being determined by an angle defining with said plane surface the outline of a space to receive a tapering winding surrounding said pole portion, and a tapering winding surrounding each said pole portion and substantially completely occupying said space.

WALTER H. EDELMAN.

Certificate of Correction

Patent No. 2,412,254.  December 10, 1946.

WALTER E. EDELMAN

It is hereby certified that errors appear in the printed specifications of the above numbered patent requiring correction as follows: Column 7, line 4, after "bearing 73" insert *which*; column 9, line 30, claim 10, for the words "motor casing" read *motor, a casing*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*